JOHN LEFFLER, OF ROCHESTER, NEW YORK.

Letters Patent No. 85,231, dated December 22, 1868.

IMPROVED BUILDING-BLOCK AND ARTIFICIAL STONE.

*The Schedule referred to in these Letters Patent and making part of the same.*

*To all whom it may concern:*

Be it known that I, JOHN LEFFLER, of the city of Rochester, county of Monroe, and State of New York, have invented a certain new and useful Improvement in Artificial Stone; and I do hereby declare that the following is a full and exact description thereof.

My invention consists of an artificial stone, for building and other purposes, formed of gravel, Rosendale cement, quick-lime, and sea-sand, compounded in the manner and in the proportions as follows:

Take, of gravel, two bushels; Rosendale cement, one bushel; quick-lime, (slaked,) two quarts; sea-sand, one quart.

First mix the gravel and cement in their dry state, then mix with this compound the quick-lime, adding water to produce the desired consistency. In this condition place the mass in moulds, and press solid. Then remove the press, and work in the sea-sand upon the surface, say from one-half to one inch in depth. Then smooth off the surface and allow the blocks to dry and harden, which will require several weeks' time, to produce the requisite strength and color for use.

This combination of parts produces a stone as strong and enduring as the natural stone.

The gravel furnishes the stony material, to crystallize and hold the other parts.

The quick-lime serves as a sort of cement or glue, to hold the gravel together, uniting the kernels, and thus forming a nucleus, to which the other parts adhere.

The Rosendale cement serves to fill the interstices, and constitutes the smooth, solid body that gives form and substance to the structure.

The sea-sand serves not only to give color to the blocks, the grain closely resembling the best natural rock for building-purposes, but also superior hardness and durability upon the exterior. By working it into the solid blocks, at considerable depth, after pressure has been applied, it forms a deep and solid coating to the block, which is very enduring, and will last as long as the block itself. By this application, the coating also serves as a protection and shield to the interior of the block.

This process of applying the sea-sand I believe to be original with myself.

What I claim as my invention, and desire to secure by Letters Patent, is—

Building-blocks, of artificial stone, compounded of the materials and in the proportions substantially as herein set forth.

Also, the method herein described, of producing blocks of artificial stone, by moulding the same of the materials herein set forth, and subsequently kneading sea-sand into the surface-portion of said blocks, after they leave the moulds, substantially as set forth.

In witness whereof, I have hereunto signed my name, in the presence of two subscribing witnesses.

JOHN LEFFLER.

Witnesses:
R. F. OSGOOD,
J. A. DAVIS.